(12) United States Patent
Nishida

(10) Patent No.: US 7,679,942 B2
(45) Date of Patent: Mar. 16, 2010

(54) STEP-DOWN DC-TO-DC CONVERTER

(75) Inventor: Junji Nishida, Osaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 185 days.

(21) Appl. No.: 11/716,591

(22) Filed: Mar. 12, 2007

(65) Prior Publication Data
US 2007/0216389 A1  Sep. 20, 2007

(30) Foreign Application Priority Data
Mar. 17, 2006  (JP) ............................ 2006-074644

(51) Int. Cl.
*G05F 1/40* (2006.01)
(52) U.S. Cl. .......................... 363/62; 323/282
(58) Field of Classification Search ................. 323/265, 323/282, 283, 351; 363/62
See application file for complete search history.

(56) References Cited

U.S. PATENT DOCUMENTS 7,180,274 B2 *  2/2007  Chen et al. ................. 323/222
2006/0221528 A1 *  10/2006  Li et al. ...................... 361/100
2008/0007232 A1 *  1/2008  Nitta et al. ................. 323/259
2008/0273354 A1 *  11/2008  Ryu et al. ................ 363/21.06

FOREIGN PATENT DOCUMENTS

| JP | 2000-092824 | 3/2000 |
| JP | 3402983 | 2/2003 |
| JP | 2005-284321 | 10/2005 |

* cited by examiner

*Primary Examiner*—Adolf Berhane
(74) *Attorney, Agent, or Firm*—Dickstein Shapiro LLP

(57) ABSTRACT

A step-down DC-to-DC converter includes an input terminal, an output terminal, a switching transistor, and a rectifying transistor. The switching circuit is connected between the input terminal and the output terminal and is configured to reduce an input voltage down to a predetermined voltage and to output the predetermined voltage from the output terminal to an external load. The series circuit includes a switching transistor and an inductor. The switching transistor is connected between the input terminal and the inductor, and is configured to perform a switching operation. The inductor is connected between the switching transistor and the output terminal. The rectifying transistor includes a P-type transistor and connected between a connected point between the switching transistor and a common ground. The rectifying transistor has a gate connected to the connected point.

8 Claims, 6 Drawing Sheets

US 7,679,942 B2

STEP-DOWN DC-TO-DC CONVERTER

BACKGROUND OF THE INVENTION

1. Field of the Invention

The present invention relates to a step-down DC-to-DC converter, and more particularly to a non-insulated step-down DC-to-DC converter including a step-down switching regulator.

2. Discussion of the Background

A non-insulated step-down DC-to-DC (direct current to direct current) converter that uses an inductor such as a step-down-type switching regulator is grouped into two different types: a synchronous type and an asynchronous type. In general, such a step-down DC-to-DC converter has a continuous mode in which the inductor continuously produces a current to flow therethrough at an application of a relatively heavy load that produces a relatively large load current. The step-down DC-to-DC converter further has an intermittent mode in which the inductor intermittently produces the current to flow therethrough at an application of a relatively small load that produces a relatively small load current.

FIG. 1 illustrates an example output circuit of an example background synchronous-type non-insulated step-down DC-to-DC converter (hereinafter referred to as a synchronous step-down DC-to-DC converter). A synchronous step-down DC-to-DC converter having such an output circuit, as shown in FIG. 1, generally achieves a relatively high efficiency in the continuous mode. However, it decreases the efficiency to an extreme extent in the intermittent mode. This is because, in the intermittent mode, the output circuit produces a reverse current that flows from the load side to the ground through a transistor M102 for synchronous rectifying.

Thus, when the load to the step-down DC-to-DC converter is reduced to a relatively light level, a switching transistor M101 and the transistor M102 for synchronous rectifying frequently perform switching. Accordingly, switching losses of the switching transistor M101 and the transistor M102 increase. To reduce the switching losses, the above step-down DC-to-DC converter changes a transistor control from a PWN (pulse-width modulation) control to a PFM (pulse frequency modulation) control.

Furthermore, when the step-down DC-to-DC converter changes its mode to the PFM control, it changes such that the output circuit forms an asynchronous rectifying so as to prevent a reduction of efficiency due to a reverse current. As illustrated in FIG. 2, a diode D101 is generally used as a rectifying element in an output circuit of an asynchronous-rectifying-type step-down Dc-to-DC converter. In the circuitry of FIG. 2, a voltage provided to the load reversely biases the diode D101 even in the intermittent mode, thereby preventing the reverse current. However, the diode D101 has a relatively large electric power consumption and is not capable of increasing efficiency because it has a relatively large forward voltage in the order of approximately 0.6 volts.

FIG. 3 illustrates another example asynchronous-type step-down DC-to-DC converter which has been improved in efficiency. In FIG. 3, a bipolar transistor Q101 for switching, i.e., a PNP transistor, has a base to which a PWM comparator (not shown) sends an output signal, a drive signal. When the drive signal is turned to a high level and the bipolar transistor Q101 is subsequently turned off, a voltage V101 appearing at one end of a inductor L101 is lowered down to a negative voltage. In a comparator CMP101, a non-inverse input terminal is connected to a point of a ground voltage and an inverse terminal is connected to a point of the voltage V101 where the bipolar transistor Q101 and the inductor L101 are connected to each other. Thus, the comparator CMP101 exhibits a hysteresis.

When the voltage V101 is lowered to a low level, the comparator CMP101 outputs a high level signal from an output terminal. This causes a MOS transistor M102 used as a rectifier to be turned on since the MOS transistor M102 has a gate connected to the output terminal of the comparator CMP101. Thereby, the inductor L101 generates no current, i.e., 0 amperes and the voltage V101 is increased. When the voltage V101 is raised to the ground voltage or above, the comparator CMP101 outputs a low level signal from the output terminal. This causes the MOS transistor M102 to be turned off so as to prevent an input of the reverse current from the load. To increase an efficiency during an asynchronous rectifying, it is effective to use a MOS transistor having a resistance in an on-state smaller than that of the diode D101 (i.e., a Schottky diode) in place of the MOS transistor M102.

As shown in FIG. 3, this circuit uses the comparator CMP101 to control the rectifying MOS transistor M102. In this case, the circuit causes a delay in operations until the MOS transistor M102 is turned on after the voltage V101 is reduced down to the negative voltage. To suppress such a delay in operations, the Schottky diode D101 is provided and, therefore, the rectifying MOS transistor M102 and the comparator CMP101 are added to the circuit of FIG. 2. That is, the circuit of FIG. 3 involves another drawback of an increase in an area of the circuit.

SUMMARY OF THE INVENTION

The present invention provides a novel step-down DC-to-DC converter which includes an input terminal, an output terminal, a switching transistor, and a rectifying transistor. The switching circuit is connected between the input terminal and the output terminal and is configured to reduce an input voltage down to a predetermined voltage and to output the predetermined voltage from the output terminal to an external load. The series circuit includes a switching transistor and an inductor. The switching transistor is connected between the input terminal and the inductor, and is configured to perform a switching operation. The inductor is connected between the switching transistor and the output terminal. The rectifying transistor includes a P-type transistor and connected between a connected point between the switching transistor and a common ground. The rectifying transistor has a gate connected to the connected point.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
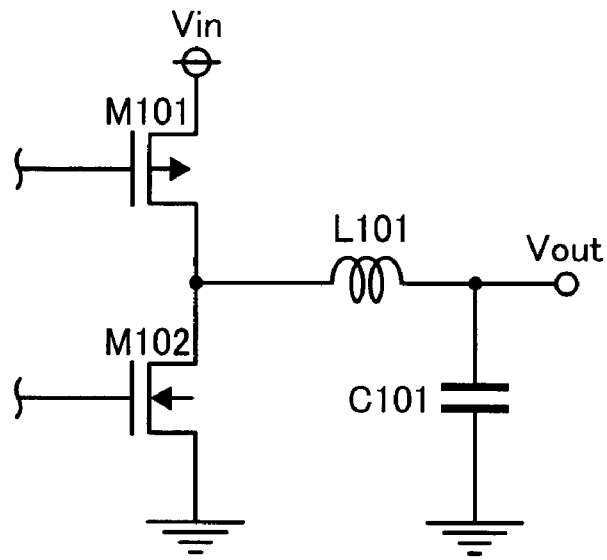
FIG. 1 is a schematic circuit diagram of an example output circuit of a background step-down DC-to-DC converter.
Figure 2:
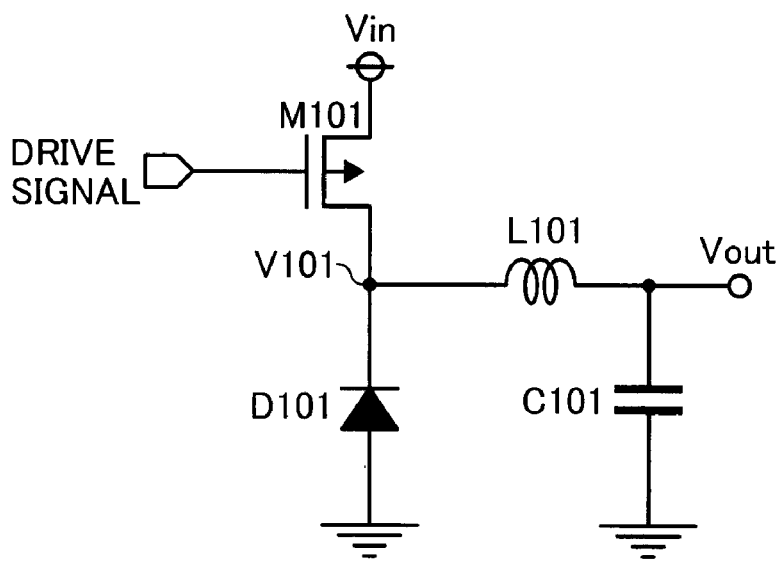
FIG. 2 is a schematic circuit diagram of an example output circuit of another step-down DC-to-DC converter.
Figure 3:
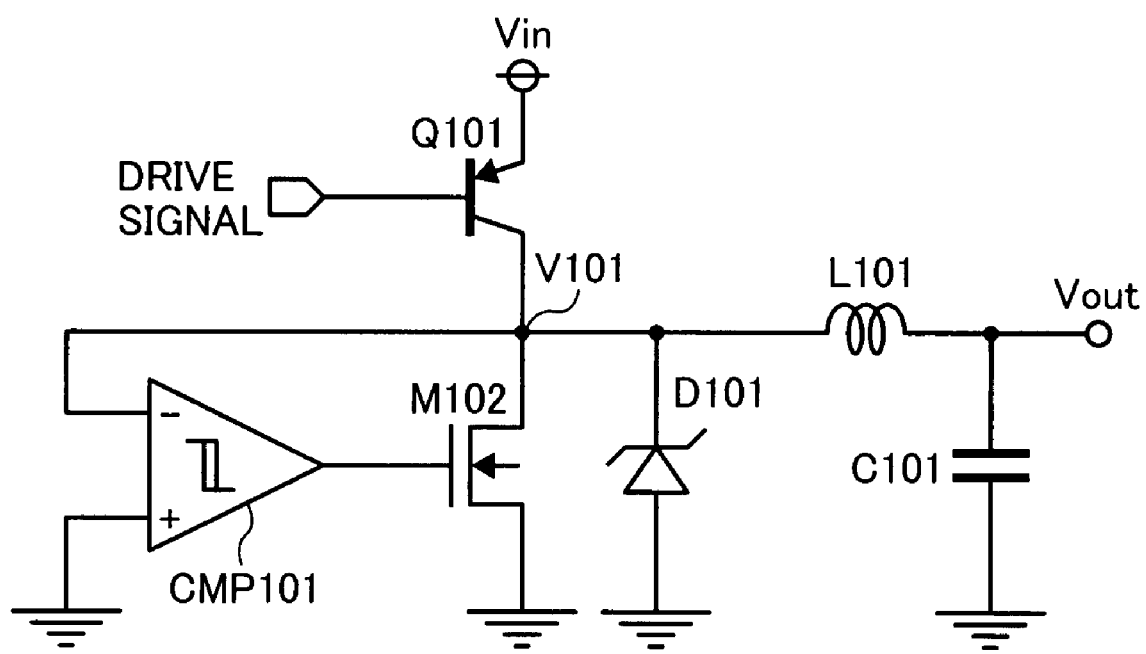
FIG. 3 is a schematic circuit diagram of an example output circuit of further another step-down DC-to-DC converter.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would hen be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to described various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Referring now to the drawings, wherein like reference numerals designate identical or corresponding parts throughout the several views, example embodiments of the present patent application are described.

Figure 4:
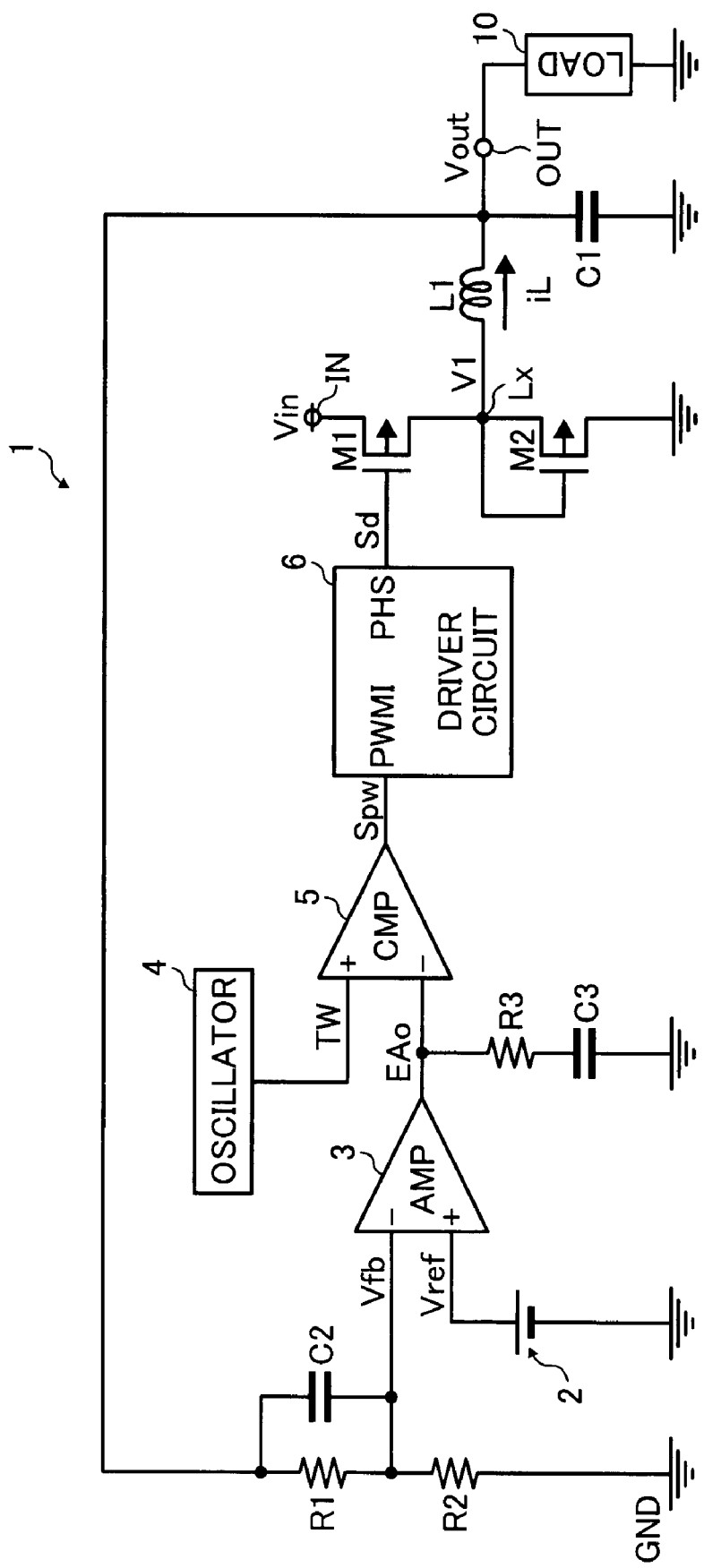
FIG. 4 is a schematic circuit diagram of an example step-down DC-to-DC converter according to an example embodiment of the present invention.

Referring now to FIG. 4 of the drawings, a non-insulated and step-down type DC-to-DC (direct-current to direct-current) converter 1 according to at least one example embodiments of the present invention is described. The non-insulated and step-down type DC-to-DC converter 1 of FIG. 4 is hereinafter referred to simply as a step-down DC-to-DC converter 1. As illustrated in FIG. 4, the step-down DC-to-DC converter 1 is a step-down type switching regulator that is configured to convert an input voltage Vin which is input thereto through an input terminal IN into a predetermined constant voltage to output it as an output voltage Vout through an output terminal OUT to a load 10.

The step-down DC-to-Dc converter 1 includes a switching transistor M1 and a rectifying transistor M2. The switching transistor M1 is a PMOS transistor configured to perform switching operations to control an output of the input voltage Vin. The rectifying transistor M2 is a PMOS transistor.

The step-down DC-to-DC converter 1 further includes a reference voltage generator 2, resistors R1 and R2 for output voltage detection, an inductor Li, a capacitor C1 for smoothing, a capacitor C2 for noise filtering, a resistor R3 and a capacitor C3 for phase compensation, an error amplifying circuit 3, an oscillating circuit 4, a PWM (pulse-width modulation) comparator 5, and a drive circuit 6.

In this step-down DC-to-DC converter 1, constituents thereof other the inductor L1 and the capacitor C1 may be integrated in one integrated circuit. As an alternative, constituents other than the inductor L1, the capacitor C1, and at least one of the switching transistor M1 and the rectifying transistor M2 may be integrated in one integrated circuit.

The reference voltage generator 2 generates and output a predetermined reference voltage Vref, and the resistors R1 and R2 detect and divide the output voltage Vout to output a divided voltage Vfb. The error amplifying circuit 3 receives the divided voltage Vfb and the reference voltage Vref and amplifies a difference between these two inputs to generate an output signal EAo.

The oscillator 4 generates and outputs a predetermined triangular-wave signal TW, and the PWM comparator 5 receives the signal EAo output from the error amplifying circuit 3 and the triangular-wave signal TW output from the oscillator 4 to generate a pulse signal Spw for performing a PWM control. The drive circuit 6 receives the pulse signal Spw and generates a drive signal Sd for driving the switching transistor M1 on a basis of the pulse signal Spw. The drive signal Sd generated by the drive circuit 6 is applied to a gate of the switching transistor M1.

The switching transistor M1 and the rectifying transistor M2 are connected in series between the input terminal In and a common ground GND having a ground level voltage. The rectifying transistor M2 has a gate connected to a connected point Lx between the switching transistor M1 and the rectifying transistor M2, and the inductor L1 is connected between the connected point Lx and the output terminal OUT. The resistors R1 and R2 are connected in series between the output terminal OUT and the common ground GND, and the divided voltage Vfb is output from a connecting point between the resistors R1 and R2. The capacitor C2 is connected in parallel to the resistor R1 between the output terminal OUT and the connecting point between the resistors R1 and R2. In addition, the capacitor C1 is connected between the output terminal OUT and the common ground GND. In the error amplifying circuit 3, the inverse input terminal receives the divided voltage Vfb, the non-inverse input terminal receives the reference voltage Vref, and the output terminal is connected to the inverse input terminal of the PWM comparator 5.

The resistor R3 and the capacitor C3 form a series circuit and are connected in series between the output terminal of the error amplifying circuit 3 and the common ground GND. This series circuit functions as a phase compensation circuit. The PWM comparator 5 receives the triangular-wave signal through the non-inverse input terminal and outputs the pulse signal Spw to an input terminal PWMI of the drive circuit 6. The drive circuit 6 outputs the drive signal Sd through an output terminal PHS to a gate of the switching transistor M1. The drive signal Sd is a clock signal switching between high and low levels.

Figure 5:
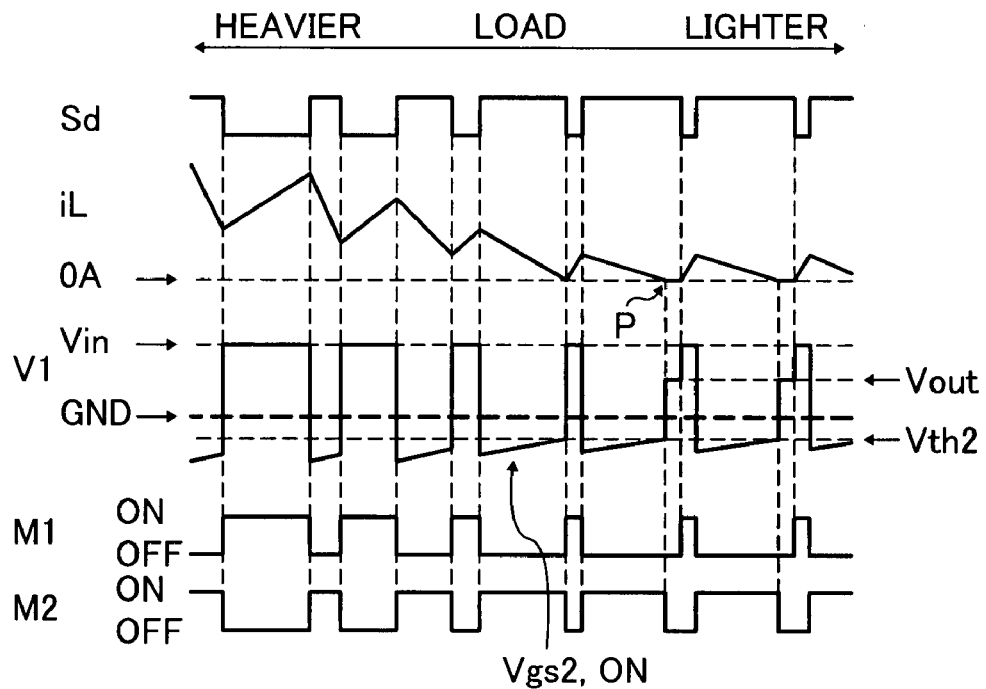
FIG. 5 is a time chart of various signals generated by the DC-to-DC converter of FIG. 4.

Referring to a time chart shown in FIG. 5, an example operation of the step-down DC-to-DC converter 1 of FIG. 4 is explained. The error amplifying circuit 3 amplifies a difference voltage between the reference voltage Vref and the divided voltage Vfb and sends the output signal EAo to the inverse input terminal of the PWM comparator 5. Since the triangular-wave signal TW output from the oscillator 4 is input to the PWM comparator 5 through its non-inverse input terminal, the PWM comparator 5 outputs the signal Spw having a pulse width in accordance with the output signal EAo from the error amplifying circuit 3 to the input terminal PWMI of the drive circuit 6.

Upon a receipt of the pulse signal Spw through the input terminal PWMI, the drive circuit 6 outputs from its output terminal PHS the drive signal Sd in accordance with the pulse width of the received pulse signal Spw so as to control the switching transistor M1 to turn on and off. In other words, when the output voltage Vout is reduced, the error amplifying circuit 3 increases the voltage of the output signal EAo. This causes the PWM comparator 5 to extend the pulse width of the output pulse signal Spw so that the switching transistor M1 increases its duty ratio of turning on time, thereby raising the output voltage Vout. In contrast to this, when the output voltage Vout is increased, the above-described operations are reversely performed to reduce the output voltage Vout to a constant voltage.

When the load 10 has a heavy load, that is, allowing a relatively large current flow, an inductor current iL which flows through the inductor L1 the switching transistor M1 may not be decreased down to 0 amperes during the time the switching transistor M1 is turned off. However, the time the switching transistor M1 is turned off is made longer and the inductor current iL is reduced when the load current is decreased. When the load current is further reduced to an extent such that a minimum current value of the inductor current iL becomes 0 amperes, as indicated by a letter P in FIG. 5, the voltage V1 is raised up to the output voltage Vout and the rectifying transistor M2 is turned off. As a result, the inductor current iL is stopped to flow and thereby an occurrence of the reverse current can be prevented.

Figure 6:
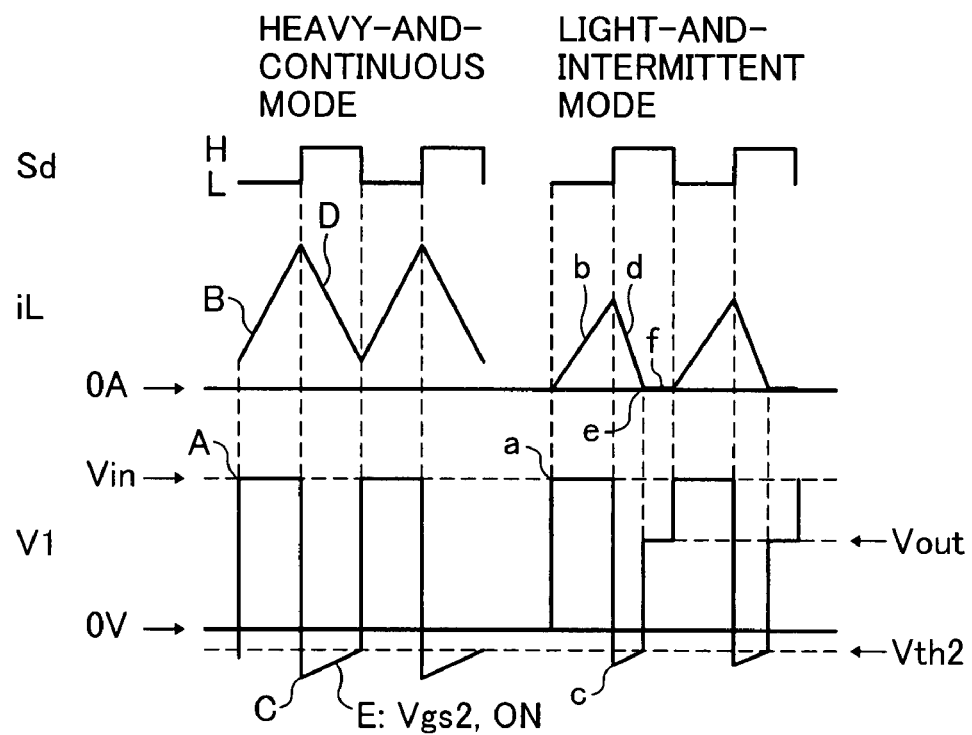
FIG. 6 is a time chart of a drive signal Sd, an inductor current iL, and a voltage V1 of the DC-to-DC converter of FIG. 4.

Referring to FIG. 6, example relationships among the drive signal Sd, the inductor current iL, and the voltage V1 at the connected point Lx in a heavy-and-continuous mode and in a light-and-intermittent mode. The heavy-and-continuous mode means that the load is applied a heavy load during the continuous mode, and the light-and-intermittent mode means that the load is applied a light load during the intermittent mode.

In the heavy-and-continuous mode, the drive signal Sd is changed from the high level to the low level so that the switching transistor M1 is turned on and the voltage V1 is raised to such a voltage as almost equal to the input voltage Vin, as indicated by a letter A in FIG. 6. During the time the drive signal Sd is at the low level, the inductor current iL is increased in such a way as indicated by a letter B in FIG. 6.

When the drive signal Sd is change from the low level to the high level, the switching transistor M1 is turned off but the inductor L1 is still in a state of allowing a current flow. This conduct of the inductor L1 generates a counter electromotive force and consequently the voltage V1 is reduced down to a negative voltage, as indicated by a letter C in FIG. 6. When the voltage V1 is reduced to a threshold voltage Vth2 of the rectifying transistor M2, the rectifying transistor M2 is turned on and, as a result, the inductor current iL is caused to flow from the common ground GND to the load 10 via the rectifying transistor M2. At this time, the voltage V1 becomes a gate voltage Vgs2 relative to a drain voltage flowing through the rectifying transistor M2. Therefore, the voltage V1 is decreased with an increase of the load current. During the time the drive signal Sd is kept at the high level, the inductor current iL is gradually decreased, as indicated by a letter D in FIG. 6. Therefore, the voltage V1, that is, the gate voltage Vgs2 at the time the rectifying transistor M2 is turned on is also gradually increased, as indicated by a letter E in FIG. 6. However, the drive signal Sd is lowered to the low level before the inductor current iL reaches 0 amperes, the inductor current iL cannot be 0 amperes.

Next, operations in the light-and-intermittent mode is explained. During a time period that the drive signal Sd becomes low, is kept at the low level, and becomes high, operations in the light-and-intermittent mode are similar to the above-described operations in the heavy-and-continuous mode and therefore explanations of these operations are omitted.

During the drive signal Sd is kept at the high level after it is raised to the high level, the inductor current iL is gradually reduced, as indicated by a letter d in FIG. 6. Therefore, the voltage V1 is gradually increased. However, when the inductor current iL reaches 0 amperes, as indicated by a letter e in FIG. 6, the voltage V1 is increased to the output voltage Vout. As a result, the rectifying transistor M2 is turned off and becomes in a state of cutoff. In this state, the inductor current iL is not allowed to flow, as indicated by a letter f in FIG. 6. Thus, an occurrence of the reverse current flow is prevented.

In this way, the step-down DC-to-DC converter 1 of FIG. 4 can prevent the reverse current flow even in the light-and-intermittent mode. That is, the step-down Dc-to-Dc converter 1 can prevent a reduction of efficiency in the light-and-intermittent mode.

Figure 7:
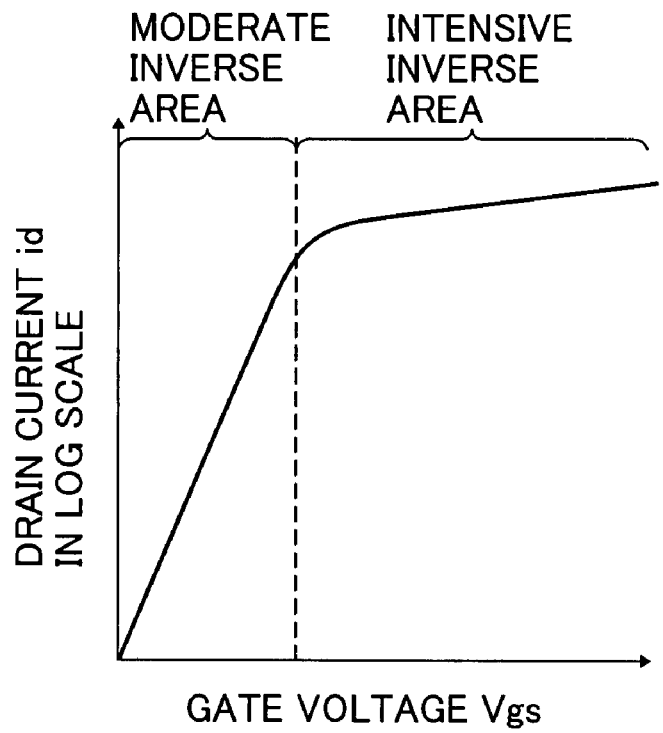
FIG. 7 is a graph representing a relationship between a gate voltage Vgs and a drain current id of a MOS transistor used in the DC-to-DC converter of FIG. 4.

Referring to FIG. 7, a general relationship between the gate voltage Vgs and the drain current id of a MOS transistor is explained. In FIG. 7, a logarithm scale is applied to the vertical axis representing the drain current of a MOS transistor. In FIG. 7, a curved line that represents the relationship between the gate voltage Vgs and the drain current id is divided into two areas: a moderate inverse area and an intensive inverse area. In the moderate inverse area, the gate voltage Vgs is proportional to a logarithmic value of the drain current id. In the intensive inverse area, the drain current id is proportional to a squared value of the gate voltage Vgs. In other words, the gate voltage Vgs is reduced with a reduction of the drain current id and therefore efficiency can be improved with a reduction of the load value.

In addition, the threshold value Vth of a MOS transistor may be variable depending upon a manufacturing process.

Therefore, it is possible to improve efficiency even during the time of a heavy load application by making the threshold value Vth smaller than a forward voltage of the conventional diode.

In this way, the step-down DC-to-DC converter 1 of FIG. 4 achieves an efficiency improvement without increasing a number of components and a size of circuitry.

Figure 8:
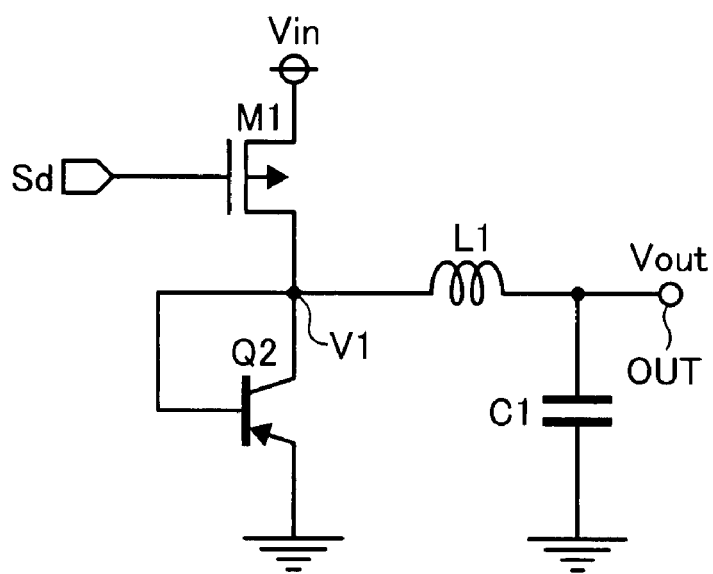
FIG. 8 is a schematic circuit diagram of an example step-down DC-to-DC converter according to another example embodiment of the present invention.

As an alternative to the rectifying transistor M2 which is the PMOS transistor shown in FIG. 4, a PNP transistor may be used in an output circuit. FIG. 8 illustrates a step-down DC-to-DC converter using a rectifying PNP transistor Q2 in an output circuit. The circuit of FIG. 8 performs operations similar to those of the output circuit shown in FIG. 1. However, it should be noted that the voltage V1 becomes an emitter-base voltage Vbe of the rectifying PNP transistor Q2 at a time the rectifying PNP transistor Q2 is turned on. Thus, the step-down DC-to-DC converter using the circuit of FIG. 8 produces an efficiency similar to that of the conventional converter using the rectifying diode.

Figure 9:
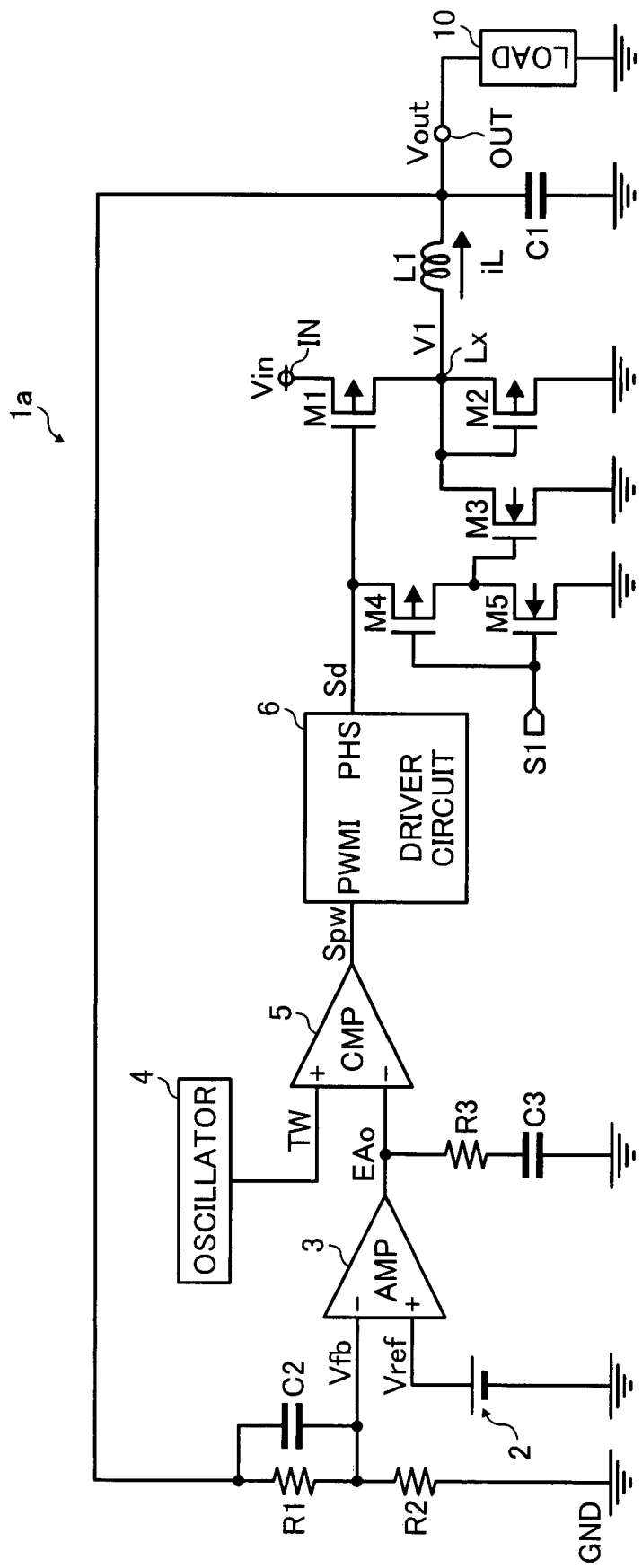
FIG. 9 is a schematic circuit diagram of an example step-down DC-to-DC converter according to another example embodiment of the present invention.

Referring to FIG. 9, a non-insulated and step-down type DC-to-DC (direct-current to direct-current) converter 1a according to another example embodiment of the present invention is described. The non-insulated and step-down type DC-to-DC converter 1a of FIG. 9 is hereinafter referred to simply as a step-down DC-to-DC converter 1a. The step-down DC-to-DC converter 1a of FIG. 9 is similar to the step-down DC-to-DC converter 1 of FIG. 4, except for transistors M3, M4 and M5 forming a synchronous rectifying circuit. The transistors M3 and M5 are NMOS transistors, and the transistor M4 is a PMOS transistor. In FIG. 9, the transistor M3 is for rectification, and the transistors M4 and M5 are to control whether to input the drive signal Sd to a gate of the transistor M3 in accordance with an external switch signal S1.

In this step-down DC-to-DC converter 1a, the synchronous rectifying transistor M3 is connected between the connected point Lx and the common ground GND, and the transistors M4 and M5 are connected in series between the gate of the switching transistor M1 and the common ground GND. The gate of the synchronous rectifying transistor M3 is connected to a connected point between the transistor M4 and the transistor M5. The external switch signal S1 is input to each of the gates of the transistor M4 and the transistor M5.

In the step-down DC-to-DC converter 1a, when a heavy load is applied, the external switch signal S1 goes to a low level, the transistor M4 is initially turned on, and the transistor M5 are turned off. Therefore, the drive signal Sd is input to the gate of the synchronous rectifying transistor M3. Thereby, the synchronous rectifying transistor M3 performs turning-on-and-off operations in a complementary manner with the switching transistor M1 so as to perform a rectifying operation. When the synchronous rectifying transistor M3 is turned on, the voltage V1 goes to almost 0 volts below the threshold voltage of the rectifying transistor M2. Therefore, the rectifying transistor M2 is kept turned off and does not contribute to the rectifying operation. But, the rectifying transistor M2 may be turned on and does contribute to the rectifying operation if the voltage V1 at the time the synchronous rectifying transistor M3 is turned on is greater than the threshold voltage of the rectifying transistor M2.

When a light load is applied, the external switch signal S1 goes to a high level, the transistor M4 is initially turned off, and the transistor M5 are turned on. Therefore, the gate of the synchronous rectifying transistor M3 is connected to the common ground GND through the transistor M5. That is, the synchronous rectifying transistor M3 is turned off and become cutoff. In this state, the step-down DC-to-DC converter 1a is substantially equalized to the circuit of FIG. 4.

That is, the rectification of the step-down DC-to-DC converter 1a is an asynchronous rectification by the rectifying transistor M2.

In this way, the step-down DC-to-DC converter 1a of FIG. 9 can circumvent the need to use a great value of the gate-source voltage Vgs of the rectifying transistor M2 as long as the inductor current iL is small as in the light load application mode. Thus, the step-down DC-to-DC converter 1a can achieve an effect of the rectification similar to that of the step-down DC-to-DC converter 1 of FIG. 4. Also, the step-down DC-to-DC converter 1a can improve the efficiency of the rectification from that of the conventional diode rectification.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2006-074644 filed on Mar. 17, 2006 in the Japan Patent Office, the entire contents of which are incorporated by reference herein.

What is claimed is:

1. A step-down DC-to-DC converter comprising:
   an input terminal;
   an output terminal;
   a switching circuit connected between the input terminal and the output terminal and configured to reduce an input voltage down to a predetermined voltage and to output the predetermined voltage from the output terminal, the switching circuit including:
      a switching transistor configured to perform a switching operation, and
      an inductor,
         wherein the switching transistor is connected between the input terminal and the inductor and the inductor is connected between the switching transistor and the output terminal;
   a rectifying transistor including a P-type transistor and connected in series between the switching transistor and a common ground, wherein a gate of the rectifying transistor is connected to and controlled by a voltage at a connection point that is between the switching transistor and the rectifying transistor;
   a synchronous rectifying transistor connected in parallel to the rectifying transistor and configured to receive an external control signal through a control electrode thereof so as to perform a switching operation in a manner complementary with the switching operation of the switching transistor; and
   a drive control circuit configured to cause the synchronous rectifying transistor to turn on when the external control signal represents an instruction of a synchronous rectifying mode and to cause the synchronous rectifying transistor to turn off into a cutoff state when the external control signal represents an instruction of a non-synchronous-rectifying mode.

2. The step-down DC-to-DC converter of claim 1, wherein the drive control circuit is configured to receive the external control signal for operating in the non-synchronous-rectifying mode when the external load operates in a relatively low power mode, and to receive the external control signal for operating in the synchronous rectifying mode when the external load operates in a regular power mode.

3. The step-down DC-to-DC converter of claim 1, wherein the rectifying transistor includes a PMOS transistor.

4. The step-down DC-to-DC converter of claim 1, wherein the rectifying transistor includes a PNP transistor.

5. A step-down DC-to-DC converter comprising:
an input terminal;
an output terminal;
a switching circuit connected between the input terminal and the output terminal and configured to reduce an input voltage down to a predetermined voltage and to output the predetermined voltage from the output terminal, the switching circuit including:
  a switching transistor configured to perform a switching operation, and
  an inductor,
  wherein the switching transistor is connected between the input terminal and the inductor and the inductor is connected between the switching transistor and the output terminal;
a rectifying transistor including a P-type transistor and connected between a connection point between the switching transistor and a common ground, the rectifying transistor having a gate connected to the connection point;
a synchronous rectifying transistor connected in parallel to the rectifying transistor and configured to receive an external control signal through a control electrode thereof so as to perform a switching operation in a manner complementary with the switching operation of the switching transistor; and
a drive control circuit configured to cause the synchronous rectifying transistor to turn on when the external control signal represents an instruction of a synchronous rectifying mode and to cause the synchronous rectifying transistor to turn off into a cutoff state when the external control signal represents an instruction of a non-synchronous-rectifying mode.

6. The step-down DC-to-DC converter of claim 5, wherein the drive control circuit is configured to receive the external control signal for operating in the non-synchronous-rectifying mode when the external load operates in a relatively low power mode, and to receive the external control signal for operating in the synchronous rectifying mode when the external load operates in a regular power mode.

7. The step-down DC-to-DC converter of claim 5, wherein the rectifying transistor includes a PMOS transistor.

8. The step-down DC-to-DC converter of claim 5, wherein the rectifying transistor includes a PNP transistor.

* * * * *